A. M. ROLAND.
TIRE REMOVING CLAMP.
APPLICATION FILED DEC. 7, 1914.
1,178,481. Patented Apr. 4, 1916.
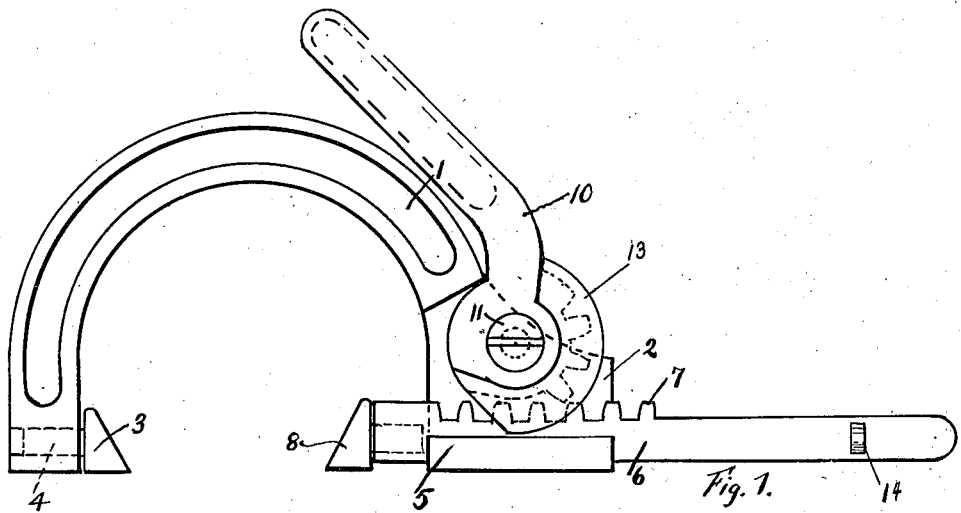
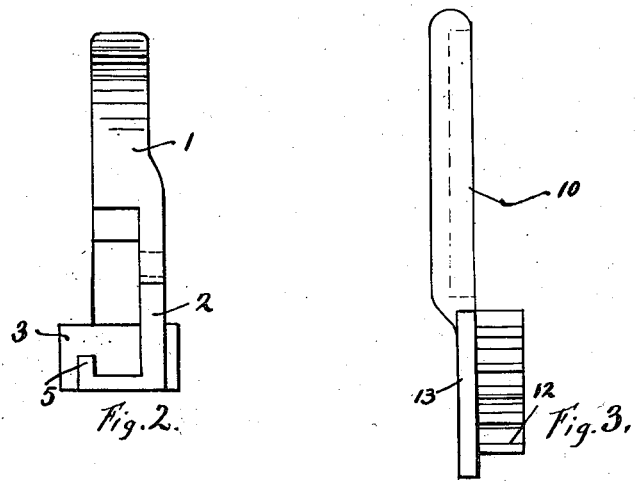
WITNESSES:
A. H. Kephart.
H. W. Jumper.
INVENTOR.
A. M. Roland.
BY
Carlos P. Griffin
ATTORNEY.

UNITED STATES PATENT OFFICE.

ARTHUR M. ROLAND, OF SAN FRANCISCO, CALIFORNIA, ASSIGNOR TO ALPHONSE NEWHOUSE, OF SAN FRANCISCO, CALIFORNIA.

TIRE-REMOVING CLAMP.

1,178,481.     Specification of Letters Patent.     Patented Apr. 4, 1916.

Application filed December 7, 1914. Serial No. 875,794.

*To all whom it may concern:*

Be it known that I, ARTHUR M. ROLAND, a citizen of the United States, residing at San Francisco, in the county of San Francisco, State of California, have invented a new and useful Tire-Removing Clamp, of which the following is a specification in such full and clear terms as will enable those skilled in the art to construct and use the same.

This invention relates to a tool for removing tires from wheels or rims and its object is to produce a tool which can be disassembled or easily adjusted for different sized tires as may be desired.

It will be understood by those skilled in the art that to enable the user to remove many different types of pneumatic tire from the rims upon which they are mounted, that it is first necessary to squeeze the two edges of the tire in contact with the rim together to release the tire from the rim, or to raise the tire out of the clencher rim.

With this invention it is easy to force the two edges of the tire together to release the tire from the rim and the device used for forcing the two parts of the rim together may be adjusted as may be necessary for different thicknesses of tires.

Another object of the invention is to provide a tire removing device which is capable of being so secured to the tire as to enable the tire to be pulled off the rim by simply pressing down on the handles with which the device is operated.

An embodiment of the invention is shown in the drawing in which the same reference numeral is applied to the same portion throughout, but I am aware that there are many modifications thereof.

Figure 1 is a side elevation of the complete device assembled, Fig. 2 is an edge view of the frame, the operating mechanism being removed therefrom, and Fig. 3 is an edge elevation of the operating handle detached from the frame.

The numeral 1 represents a U shaped frame having an enlarged portion 2 at one end and carrying a tire bearing head 3 at the other end, said head having a pin 4 thereon which projects into an opening in the end of the frame 1. The end 2 is provided with an upwardly extending flange 5 which flange forms a slide-way for the rack bar 6, said rack bar having teeth 7 and a tire bearing head 8 similar to the head 3.

Above the rack bar 6 which also forms a handle there is a handle 10 pivoted to the frame by means of the screw stud 11, which handle carries teeth 12 and a flange 13 which bears on the side of the bar 6 assisting in holding it in its proper position. The number of teeth on the handle 10 is such as to enable the handle to be turned to a position, note Fig. 1, in which the bar 6 can be moved back and forth without interfering in any way with the teeth on the handle and when the bar has been pushed into contact with the tire the handle may then be turned to such a position on the rack bar as to force the heads 3 and 8 tightly into engagement therewith and thereby squeeze the two edges of the tire together and release them from the rim, whereupon the tool may be used as a lever to pry the tire free from the rim.

It will be obvious that the device may be made in such sizes as is deemed necessary.

An advantage of the device lies in the fact that it may be easily disassembled by simply removing the stud 11, whereupon the several parts will at once separate, the flange 5 and flange 13 being the only parts that hold the rack bar 6 in place.

In order to secure the device to the tire the handle 10 is so offset that it will pass the handle 6, which latter handle is provided with an enlargement 14 on the side thereof to hold the segment gear handle in contact therewith when the sides of the pneumatic tires have been squeezed together, the handle 10 having a depression extending longitudinally thereof which serves to lighten the handle and also to receive the enlargement 14.

Having thus described my invention what I claim as new and desire to secure by Letters Patent of the United States, is as follows, modifications within the scope of the claims being expressly reserved:

1. A device for removing tires comprising a U shaped clamp having a flanged guide way, a flanged segment gear pivoted to the clamp, a rack bar movable in the guide way and held in place by said segment gear flange and the flange on the side of the guideway, a handle on the side of the segment gear adapted to be moved into a position at the side of and substantially parallel to the rack bar when it is pushed into contact with a tire on said rack bar to hold the rack bar and handle on the segment gear in a given position.

2. A device for removing tires comprising a U shaped clamp having a head pivoted to one end and having a flanged guide way on the other end thereof, a rack bar carrying a pivoted head slidable in said flanged guide way, a segment gear having a flange to assist in holding the rack bar in place in its guide way, a handle connected with said segment gear and offset from the side thereof to move in a plane at the side of the rack bar, and a lug on the rack bar adapted to bear in a depression extending longitudinally of the handle on the segment gear to hold the segment gear handle and rack bar in a fixed relation, the gear handle then lying substantially parallel to the rack bar.

In testimony whereof I have hereunto set my hand this 25th day of November, A. D. 1914, in the presence of the two subscribed witnesses.

ARTHUR M. ROLAND.

Witnesses:
HENRY B. LISTER,
A. H. KEPHART.